(12) United States Patent
Javadi

(10) Patent No.: US 12,442,748 B1
(45) Date of Patent: Oct. 14, 2025

(54) STIMULUS RESPONSE TESTING USING AUTOMATED FLOW CYTOMETRY PROTOCOLS

(71) Applicant: Stratedigm, Inc., San Jose, CA (US)

(72) Inventor: Shervin Javadi, San Jose, CA (US)

(73) Assignee: Shero Diagnostics, San Jose, CA (US)

( * ) Notice: Subject to any disclaimer, the term of this patent is extended or adjusted under 35 U.S.C. 154(b) by 751 days.

(21) Appl. No.: 17/531,504

(22) Filed: Nov. 19, 2021

Related U.S. Application Data

(60) Provisional application No. 63/116,706, filed on Nov. 20, 2020.

(51) Int. Cl.
*G01N 15/14* (2024.01)
*G01N 33/58* (2006.01)

(52) U.S. Cl.
CPC .......... *G01N 15/14* (2013.01); *G01N 33/582* (2013.01); *G01N 2015/1402* (2013.01)

(58) Field of Classification Search
CPC ................. G01N 15/14; G01N 33/582; G01N 2015/1402
USPC ..................................................... 422/82.08
See application file for complete search history.

(56) References Cited

U.S. PATENT DOCUMENTS

2010/0221756 A1\* 9/2010 Sainte-Laudy .... G01N 33/5047
435/7.24
2012/0083007 A1\* 4/2012 Nadeau ............. G01N 33/5094
435/7.24

\* cited by examiner

*Primary Examiner* — Jill A Warden
*Assistant Examiner* — Jacqueline Brazin
(74) *Attorney, Agent, or Firm* — Kilpatrick Townsend & Stockton LLP

(57) ABSTRACT

Provided herein are methods for the automated testing of a sample response to one or more chemical stimuli. The provided methods are particularly useful for the automated analysis of allergic responses. Also provided are computer systems and instructions for implementing the provided methods.

20 Claims, 9 Drawing Sheets

200

201
MEASURE, USING FLOW CYTOMETRY OF A FIRST PORTION OF A SAMPLE, ONE OR MORE FLUORESCENCE INTENSITIES ASSOCIATED WITH ACTIVATION OF THE FIRST PORTION AS INDUCED BY A FIRST CONCENTRATION OF A CHEMICAL STIMULUS

202
DETERMINE WHETHER AN ACTIVATION RESPONSE IS LESS THAN A PRESELECTED THRESHOLD, WHEREIN THE ACTIVATION RESPONSE IS A FUNCTION OF THE ONE OR MORE MEASURED FLUORESCENCE INTENSITIES

203
PROVIDE AN OPERATION CONFIGURED TO BE PERFORMED BASED ON A DETERMINATION THAT THE ACTIVATION RESPONSE IS LESS THAN THE PRESELECTED THRESHOLD, WHEREIN THE OPERATION COMPRISES QUANTIFYING, USING FLOW CYTOMETRY OF A SECOND PORTION OF THE SAMPLE, ONE OR MORE FLUORESCENCE INTENSITIES ASSOCIATED WITH ACTIVATION OF THE SECOND PORTION AS INDUCED BY A SECOND CONCENTRATION OF THE CHEMICAL STIMULUS, WHEREIN THE SECOND CONCENTRATION IS GREATER THAN THE FIRST CONCENTRATION

STIMULUS RESPONSE TESTING USING AUTOMATED FLOW CYTOMETRY PROTOCOLS

CROSS-REFERENCE TO RELATED APPLICATIONS

The present application claims priority to U.S. Provisional Application No. 63/116,706 filed Nov. 20, 2020, the full disclosure of which is incorporated by reference in its entirety for all purposes

BACKGROUND

Flow cytometry is a valuable tool for detecting and measuring the physical and chemical characteristics of large numbers of cells or particles. By flowing a sample suspension of the cells or particles past one or more beams of laser light, this technique can quickly record light scattering or fluorescence emissions resulting from the laser illumination of the cells or particles. These scattering or fluorescence emissions readings can be then used for varied applications involving one or more of the counting, sorting, and identification of the sample suspension contents.

One such flow cytometry application is the basophil activation test (BAT). The BAT is a functional assay measuring the degree to which immunoglobulin E (IgE) induces the activation of basophils in the presence of an allergen, by effectively reproducing IgE-mediated allergic reactions in vitro. More specifically, the BAT uses flow cytometry to measure fluorescence associated with the expression of activation markers on the surfaces of basophils. These activation markers are known to be upregulated following the cross-linking of IgE antibodies bound to the high-affinity IgE receptor (FcεRI) as a result of allergen stimulation.

While the basophil activation test provides several advantages over skin tests traditionally used to identify clinically allergic individuals, the BAT is still prone to complications typical of any such stimulus response fluorescence or flow cytometry approach. For example, tests yielding response results that seem positive may be caused by sensitivity or intolerance to the assay conditions themselves, rather than to the tested stimulus. Conversely, tests yielding response results that appear negative may be caused by limitations inherent to the assay, or by insufficient supply or availability of the stimulus within the assay, rather than by a truly non-responsive sample. These issues can be addressed at least in part by manual adjustments and reattempts of assay process conditions. Such interventions, though, can be time-, labor- and resource-intensive at best, and lacking in clear guidance at worst.

In view of these observations, there is a need in the art for improved automated methods and systems for flow cytometry stimulus response tests. The present disclosure addresses these needs and provides associated and other advantages.

BRIEF SUMMARY

In one aspect, the disclosure provides a method for automated testing of a sample response to a chemical stimulus. The method includes measuring, using flow cytometry of a first portion of the sample, one or more fluorescence intensities associated with activation of the first portion as induced by a first concentration of the chemical stimulus. The method further includes determining whether an activation response is greater than a preselected threshold. The activation response is a function of the one or more measured fluorescence intensities. The method further includes providing an operation configured to be performed based on a determination that the activation response is greater than the preselected threshold. The operation includes quantifying, using flow cytometry of a second portion of the sample, one or more fluorescence intensities associated with activation of the second portion as induced by a second concentration of the chemical stimulus. The second concentration is lower than the first concentration.

In another aspect, the disclosure provides another method for automated testing of a sample response to a chemical stimulus. The method includes measuring, using flow cytometry of a first portion of the sample, one or more fluorescence intensities associated with activation of the first portion as induced by a first concentration of the chemical stimulus. The method further includes determining whether an activation response is less than a preselected threshold. The activation response is a function of the one or more measured fluorescence intensities. The method further includes providing an operation configured to be performed based on a determination that the activation response is less than the preselected threshold. The operation includes quantifying, using flow cytometry of a second portion of the sample, one or more fluorescence intensities associated with activation of the second portion as induced by a second concentration of the chemical stimulus. The second concentration is greater than the first concentration.

In another aspect, the disclosure provides a method for automated testing of a sample response to a panel of chemical stimuli, the method comprising measuring, using flow cytometry of a first portion of the sample, one or more fluorescence intensities associated with activation of the first portion as induced by a combination of two or more chemical stimuli. The method further includes determining whether a first activation response is greater than a preselected threshold. The first activation response is a function of the one or more measured fluorescence intensities. The method further includes providing a first operation configured to be performed based on a determination that the first activation response is greater than the preselected threshold. The operation includes quantifying, using flow cytometry of a second portion of the sample, one or more fluorescence intensities associated with activation of the second portion as induced by a first chemical stimulus of the two or more chemical stimuli.

In another aspect, the disclosure provides a machine-readable non-transitory medium embodying information indicative of instructions for causing one or more machines to perform operations for automated testing of a sample response to a chemical stimulus. The operations include measuring, using flow cytometry of a first portion of the sample, one or more fluorescence intensities associated with activation of the first portion as induced by a first concentration of the chemical stimulus. The operations further include determining whether an activation response is greater than a preselected threshold. The activation response is a function of the one or more measured fluorescence intensities. The operations further include, based on a determination that the activation response is greater than the preselected threshold, quantifying, using flow cytometry of a second portion of the sample, one or more fluorescence intensities associated with activation of the second portion as induced by a second concentration of the chemical stimulus. The second concentration is lower than the first concentration.

In another aspect, the disclosure provides another machine-readable non-transitory medium embodying information indicative of instructions for causing one or more machines to perform operations for automated testing of a sample response to a chemical stimulus. The operations include measuring, using flow cytometry of a first portion of the sample, one or more fluorescence intensities associated with activation of the first portion as induced by a first concentration of the chemical stimulus. The operations further include determining whether an activation response is less than a preselected threshold. The activation response is a function of the one or more measured fluorescence intensities. The operations further include, based on a determination that the activation response is less than the preselected threshold, quantifying, using flow cytometry of a second portion of the sample, one or more fluorescence intensities associated with activation of the second portion as induced by a second concentration of the chemical stimulus. The second concentration is greater than the first concentration.

In another aspect, the disclosure provides a machine-readable non-transitory medium embodying information indicative of instructions for causing one or more machines to perform operations for automated testing of a sample response to a panel of chemical stimuli. The operations include measuring, using flow cytometry of a first portion of the sample, one or more fluorescence intensities associated with activation of the first portion as induced by a combination of two or more chemical stimuli. The operations further include determining whether a first activation response is greater than a preselected threshold. The first activation response is a function of the one or more measured fluorescence intensities. The operations further include, based on a determination that the first activation response is greater than the preselected threshold, quantifying, using flow cytometry of a second portion of the sample, one or more fluorescence intensities associated with activation of the second portion as induced by a first chemical stimulus of the two or more chemical stimuli.

In another aspect, the disclosure provides a computer system for testing of a sample response to a chemical stimulus. The system includes one or more components of a flow cytometry machine, at least one processor, and a memory operatively coupled with the at least one processor. The at least one processor executes instructions from the memory. The instructions include program code for measuring, using flow cytometry of a first portion of the sample, one or more fluorescence intensities associated with activation of the first portion as induced by a first concentration of the chemical stimulus. The instructions further include program code for determining whether an activation response is greater than a preselected threshold. The activation response is a function of the one or more measured fluorescence intensities. The instructions further include program code for an operation configured to be performed based on a determination that the activation response is greater than the preselected threshold. The operation includes quantifying, using flow cytometry of a second portion of the sample, one or more fluorescence intensities associated with activation of the second portion as induced by a second concentration of the chemical stimulus. The second concentration is lower than the first concentration.

In another aspect, the disclosure provides another computer system for testing of a sample response to a chemical stimulus. The system includes one or more components of a flow cytometry machine, at least one processor, and a memory operatively coupled with the at least one processor. The at least one processor executes instructions from the memory. The instructions include program code for measuring, using flow cytometry of a first portion of the sample, one or more fluorescence intensities associated with activation of the first portion as induced by a first concentration of the chemical stimulus. The instructions further include program code for determining whether an activation response is less than a preselected threshold. The activation response is a function of the one or more measured fluorescence intensities. The instructions further include program code for an operation configured to be performed based on a determination that the activation response is less than the preselected threshold. The operation includes quantifying, using flow cytometry of a second portion of the sample, one or more fluorescence intensities associated with activation of the second portion as induced by a second concentration of the chemical stimulus. The second concentration is greater than the first concentration.

In another aspect, the disclosure provides a computer system for testing of a sample response to a panel of chemical stimuli. The system includes one or more components of a flow cytometry machine, at least one processor, and a memory operatively coupled with the at least one processor. The at least one processor executes instructions from the memory. The instructions include program code for measuring, using flow cytometry of a first portion of the sample, one or more fluorescence intensities associated with activation of the first portion as induced by a combination of two or more chemical stimuli. The instructions further include program code for determining whether a first activation response is greater than a preselected threshold. The first activation response is a function of the one or more measured fluorescence intensities. The instructions further include program code for a first operation configured to be performed based on a determination that the first activation response is greater than the preselected threshold. The operation includes quantifying, using flow cytometry of a second portion of the sample, one or more fluorescence intensities associated with activation of the second portion as induced by a first chemical stimulus of the two or more chemical stimuli.

DETAILED DESCRIPTION

Figure 1:
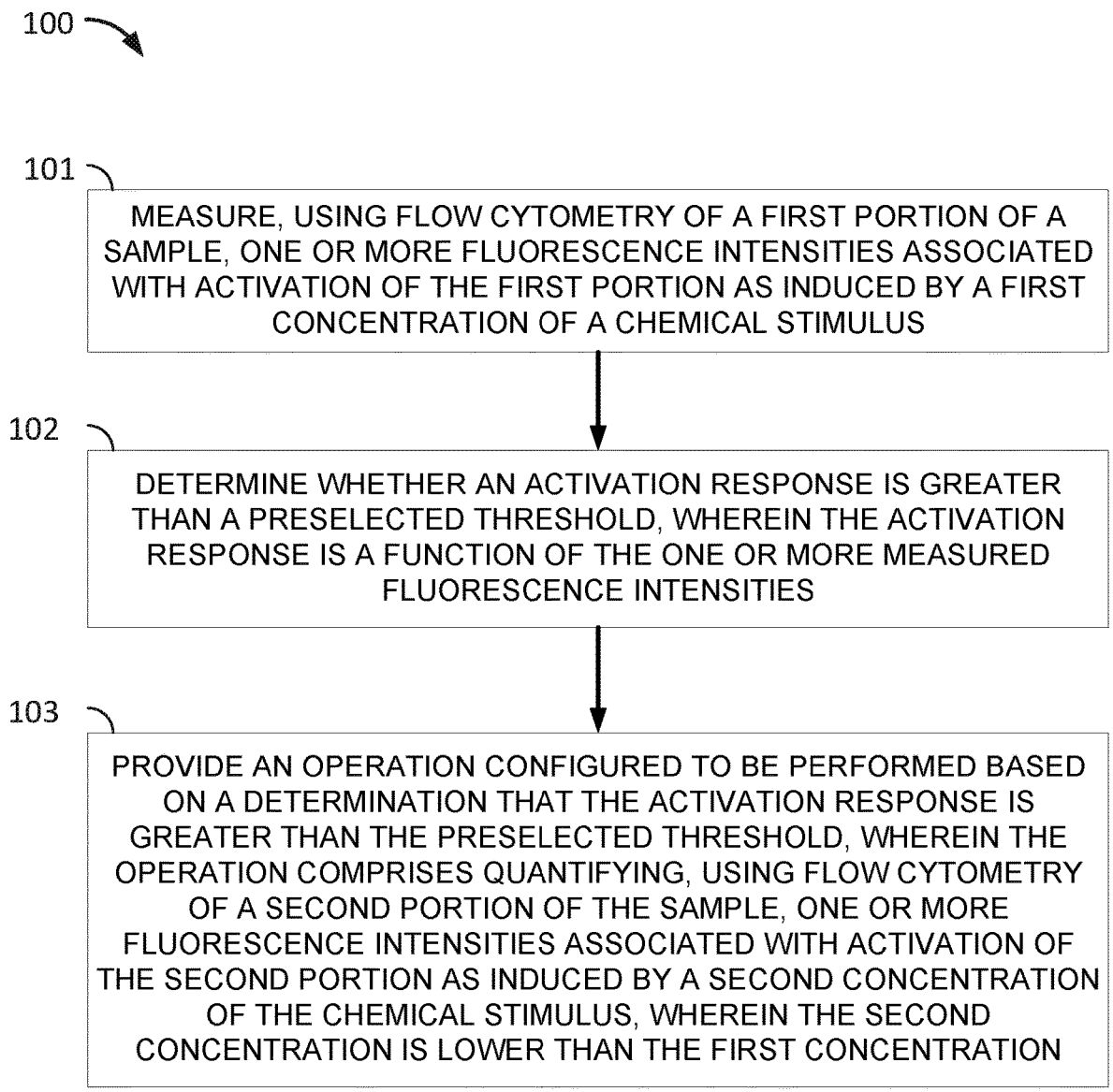
FIG. 1 is a flowchart of a method in accordance with a provided embodiment for the automated testing of a sample response to a chemical stimulus beginning at a high concentration.

The present disclosure generally relates to automation processes and systems that, when employed for example to fluorescence or flow cytometry assays measuring responses to chemical stimuli, can provide advantageous improvements in efficiency and accuracy. For example, it would be beneficial for a stimulus response test carried out using flow cytometry to require fewer operations to acquire desired accurate test results. The automation techniques disclosed herein can provide these benefits by using various strategies developed to eliminate unnecessary measurements and to quickly and efficiently improve upon equivocal test findings.

An example of a flow cytometry stimulus response test that can benefit from the provided methods and systems is the basophil activation test (BAT). The BAT is intended for the determination of CD63 surface marker expression on basophils upon antigen stimulation. In this way, the BAT can provide important information about the reactions an individual may suffer from when exposed to different allergens. It has been difficult, however, to identify strictly standardized operation procedures universally suitable for use with BAT. One reason for this is that the responses observed when running the test can vary significantly depending on the individual a sample is obtained from, the clinician and instrumentation used in performing the test, and the potential allergen being queried. Furthermore, the observed responses can often be equivocal. As an example, both seemingly positive and negative results could arise from reasons independent of the actual stimulus response profile of the sample.

The methods and systems disclosed herein advantageously result in a fully automated, start-to-finish approach in which a flow cytometer evaluates results from a first pass screen, and then autonomously determines if and how one or more tests need to be repeated. The autonomous determinations could result in, for example, further testing with a lower or higher stimulus concentration, or further testing with greater or fewer stimuli from among a panel of interest. The determinations, while autonomous, can importantly be based on limits and threshold values preselected by a user, providing the disclosed methods and systems with flexibility and customization in their application.

Automated Stimulus Response Testing Methods

In one aspect, a method for automated testing of a sample response to a chemical stimulus is disclosed. Table 1 below illustrates exemplary behavior typical of stimulus response tests. The table indicates positive response observations and negative response observations for various combinations of stimulus concentrations and sample behavior. More specifically, the columns of the table correspond to cases in which the sample is highly responsive to the stimulus being tested, mildly responsive to the stimulus, not responsive, or sensitized to the assay. In this latter case, the sample is sensitized or intolerant to the underlying assay conditions themselves, and not to the presence of the particular chemical stimulus.

TABLE 1

Exemplary sample responses to different stimulus concentrations

| Stimulus Concentration | Highly Responsive | Mildly Responsive | Not Responsive | Assay Sensitized |
|---|---|---|---|---|
| Low | + | − | − | − |
| Medium | + | + | − | − |
| High | + | + | − | + |

As can be seen from the Table, a reading suggestive of a positive test result is by itself insufficient to determine that a sample is truly responsive to the tested stimulus. This is because, without knowing more about the stimulus concentration tested, one cannot distinguish between a positive test result attributable to a responsive sample, and a positive test result attributable to an assay-sensitized sample. Similarly, a reading suggestive of a negative test result is by itself insufficient to determine that a sample is truly not response to the tested stimulus. This is because, without knowing more about the stimulus concentration tested, one cannot distinguish between a negative test result attributable to an unresponsive sample, and a negative test result attributable to a merely mildly responsive sample. Furthermore, without more information one cannot unambiguously decide on or implement the next step in clarifying these equivocal results.

To address these issues, the provided method can perform a first measurement (e.g., an initial measurement) of a sample response to either an intentionally high stimulus concentration, or an intentionally low stimulus concentration. In the case of a high stimulus concentration, as shown in Table 1, a negative result provides a clear indication that the sample is not responsive to the stimulus, while a positive result provides an indication that a following measurement should be taken using a lower stimulus concentration. In case of a low stimulus concentration, also as shown in Table 1, a positive result provides a clear indication that the sample is responsive to the stimulus, while a negative result provides an indication that a following measurement should be taken using a higher stimulus concentration.

Chemical Stimulus

A wide range of chemical stimuli are suitable for use with the provided methods. As used herein, the terms "stimulus" and "chemical stimulus" refer to a chemical entity capable of eliciting a measurable change in the characteristics of a sample that is responsive to the chemical entity. In some embodiments, the chemical stimulus includes an antigen. In some embodiments, the chemical stimulus includes an allergen.

In some embodiments, the chemical stimulus includes a food allergen. The food allergen can include, for example, an egg allergen such as egg white, egg yolk, or a combination thereof. The food allergen can include, for example, a milk allergen such as cow milk, α-lactalbumin, β-lactoglobulin, casein, or a combination thereof. The food allergen can include, for example, a fish or meat allergen such as codfish, crab, shrimp, anisakis, pork, beef, α-Gal-HSA, or a combination thereof. The food allergen can include, for example, a fruit or vegetable allergen such as tomato, carrot, orange, celery, peach, garlic, apple, or a combination thereof. The food allergen can include, for example, a seed, bean, or nut allergen such as sesame, peanut (e.g., Ara h 1, Ara h 2, Ara h 6, and the like), soybean, hazelnut, almond, cashew, pistachio, walnut, coconut, or a combination thereof. The food allergen can include, for example, a grain allergen such as wheat, gluten, gliadin, rye, barley, oat, corn, rice, baker's yeast, or a combination thereof. The food allergen can include, for example, a spice allergen such as paprika, curry, chili, coriander, curcumin, or a combination thereof. The food allergen can include, for example, a food additive allergen such as tartrazine, methylene blue, sodium benzoate, sodium nitite, potassium metabisulfate, sodium salicylate, Quinoline Yellow, Sunset Yellow FCF, Chromotrope FB, amaranth, New Coccine, erythrosine, Patent Blue V, indigo carmine, Brilliant Black BN, sorbic acid, carboxymethylcellulose, glutamate, or a combination thereof.

In some embodiments, the chemical stimulus includes a drug allergen. The drug allergen can include, for example, an antibiotic such as penicillin G, benzylpenicilloyl polylysin, benzylpenicillin, penicillin V, cephalosporin C, cefamandole, cefazolin, cefuroxime, cefaclor, ceftriaxone, levofloxacin, sulfamethoxazole, trimethoprim, tetracycline, doxycycline, ciprofloxacin, moxifloxacin, ampicillin, amoxicillin, clarithromycin, clavulanic acid, clindamycin, erythromycin, rifampicin, or a combination thereof. The drug allergen can include, for example, an analgesic such as aspirin, diclofenac, ibuprofen, indomethacin, acetaminophen, mefenamic acid, phenylbutazone, propyphenazone, dipyrone, naproxen, tramadol, salicylic acid, or a combination thereof. The drug allergen can include, for example, a myorelaxant such as atracurium besylate, cisatracurium besilate, mivacurium, pancuronium bromide, propofol, rocuronium, suxamethonium chloride, vecuronium bromide, or a combination thereof. The drug allergen can include, for example, an anesthetic such as articaine, bupivacaine, mepivacaine, lidocaine, or a combination thereof. The drug allergen can include, for example, a contrast agent such as iobitridol, iodixanol, iohexol, iomeprol, iopamidol, iopromide, ioxaglate, or a combination thereof. The drug allergen can include, for example, an antiseptic such as chlorhexidine. The drug allergen can include, for example, a proton pump inhibitor such as omeprazole, esomeprazole, pantoprazole, lansoprazole, or a combination thereof. The drug allergen can include, for example, a beta blocker such as bisoprolol, metoprolol, or a combination thereof. The drug allergen can include, for example, an ACE inhibitor such as ramipril.

In some embodiments, the chemical stimulus includes an environmental allergen. The environmental allergen can include, for example, pollen from a grass such as Bermuda grass, orchard grass, rye grass, Timothy grass, or a combination thereof. The environmental allergen can include, for example, pollen from a weed such as ragweed, mugwort, ribwort, pellitory, or a combination thereof. The environmental allergen can include, for example, pollen from a tree such as birch, hazel, oak, olive, or a combination thereof. The environmental allergen an include, for example, a mold such as *Penicillium, Cladosporium, Aspergillus, Candida albicans, Alternaria*, or a combination thereof. The environmental allergen can include, for example, an animal or insect allergen such as dust mite, flour mite, cat, dog, horse, or a combination thereof. The environmental allergen can include, for example, an insect venom such as bee venom, yellow jacket venom, hornet venom, wasp venom, or a combination thereof. The environmental allergen can include, for example, an occupational allergen such as latex.

Sample

A wide range of samples are suitable for use with the provided methods. In some embodiments, the sample is obtained from a subject. As used herein, the term "subject" refers to animals such as mammals, including, but not limited to, primates (e.g., humans), cows, sheep, goats, horses, dogs, cats, rabbits, rats, mice and the like. In certain embodiments, the subject is a human.

In some embodiments, the sample includes a bodily fluid. As used herein, the term "bodily fluid" refers to a fluid obtained from the body of a mammal. Bodily fluids include, but are not limited to, aqueous humour, bile, whole blood, plasma, serum, red blood cells, white blood cells, breast milk, interstitial fluid, lymph, mucus, pleural fluid, pus, saliva, sweat, tears, urine, cerebrospinal fluid, synovial fluid, or intracellular fluid. One of skill in the art will appreciate that other bodily fluids are useful in the provided methods.

In some embodiments, the sample includes whole blood. In some embodiments, the sample includes isolated peripheral blood mononuclear cells (PBMCs), which include the basophils. In some embodiments, the sample includes isolated basophils. In some embodiments, the use of whole blood rather than isolated PBMCs or basophils may be preferred as the whole blood can be more representative of physiological environmental conditions. For example, in the case of allergic reaction tests such as BAT, the presence of blood factors such as blocking antibodies can influence the response of the sample to the chemical stimulus.

Antibodies

In some embodiments, the sample is contacted with antibodies to one or more identification markers. Fluorescence associated with antibody detection of identification markers can be used in some embodiments to select cell populations within the sample as discussed in further detail below. In some embodiments, the identification markers include CCR3, expressed by basophils, mast cells, and Th2 lymphocytes. In some embodiments, the identification markers include CD203c, expressed in basophils, mast cells, and $CD34^+$ progenitor cells. In some embodiments, the identification markers include CD123, expressed in basophils and plasmacytoid dendritic cells. In some embodiments, the identification markers include CRTH2, expressed in basophils, eosinophils, and Th2 lymphocytes.

In some embodiments, the sample is contacted with antibodies to one or more activation markers. Fluorescence associated with antibody detection of activation markers can be used in some embodiments to quantify activation responses, e.g., activation of basophil cells, within the sample as discussed in further detail below. In some embodiments, the activation markers include CD107a and/or CD107b expressed in basophils, mast cells, T cells, and NK cells. In some embodiments, the activation markers include CD13, expressed in basophils and myeloid cells. In some embodiments, the activation markers include CD164, expressed in basophils and $CD34^+$ progenitor cells. In some embodiments, the activation markers include CD69, expressed in basophils, lymphocytes, neutrophils, monocytes, and eosinophils. In some embodiments, the activation markers include p38 MAPK, expressed in basophils and various other cell types. In some embodiments, the activation markers include STAT5, expressed in basophils and various other cell types.

In some embodiments, the activation markers include CD63, expressed in basophils, mast cells, platelets, and macrophages. The CD63 marker is a fluorescein isothiocyanate labeled antigen which can bind to a CD63 protein and readily be used for flow cytometry cell sorting and analysis. For example, an FITC labeled antigen can be used to emit light at a wavelength of 530 nm. Because the emitted fluorescence intensity is proportional to the binding sites of each single cell, an increase in the intensity of 530-nm fluorescence can be correlated with the number of FITC-conjugated antibodies bound to CD63 expressing cells.

Other Components

In some embodiments, the sample is contacted with one or more control markers. Fluorescence associated with control markers can be used in some embodiments as a positive control or negative control indicative of a functioning assay. In some embodiments, the control markers include antibodies to the Fc epsilon receptor (anti-FcεRI). Antibodies to FcεRI can provide a positive control by mimicking the bridging of the receptor caused by the binding of an allergen to two IgE molecules. In some embodiments, the control markers include N-formylmethionyl-leucyl-phenylalanine (fMLP). This tripeptide molecule can provide a positive control by causing basophil activation in a non-immunologic way. In some embodiments, an assay buffer lacking any chemical stimuli is used as a negative control to assess background fluorescence or fluorescence independent of chemical stimulation.

In some embodiments, the sample is contacted with one or more components (e.g., stimulation buffer components) influencing the response of the sample to the chemical stimulus. In some embodiments, the sample is contacted with interleukin-3 (IL-3). In some embodiments, the sample is contacted with heparin. In some embodiments, the sample is contacted with calcium.

Flow Cytometry

In some embodiments, the sample is contacted with one or more chemical entities that include a fluorophore. A fluorophore is a chemical compound that absorbs light energy at one wavelength and nearly instantaneously emits light at another, longer wavelength of lower energy. Most fluorophores are either heterolytic or polyaromatic hydrocarbons. The fluorescence signature of each fluorophore can uniquely provide the wavelengths and amount of light absorbed and emitted. When a population of fluorophores is excited by light of an appropriate wavelength, fluorescent light is emitted. The intensity of fluorescence emitted by a fluorophore depends on the efficiency with which fluorophores absorb and emit photons, and their ability to undergo repeated excitation/emission cycles. The intensity of the emitted fluorescence light can be a linear function of the amount of fluorophores present, with the signal intensity becoming nonlinear at very high fluorophore concentrations. The emitted light intensity can be measured by, e.g., a flow cytometer or a fluorimeter.

The flow cytometry of the provided methods can also include detection of one or both of forward scatter and side scatter. In some embodiments, the flow cytometry includes generating a histogram plotting forward scatter and side scatter on different axes, and identifying populations within the histogram. The identified populations can include, for example, lymphocytes, monocytes, and granulocytes. In some embodiments, the flow cytometry includes generating a histogram plotting fluorescence and side scatter on different axes, and identifying populations within the histogram. The identified populations can include, for example, basophils and eosinophils.

The identification and selection of populations within the sample using flow cytometry can include the application of one or more gates. As used herein, the term "gate" or "gates," generally refers to one or more selection criteria for events on a flow cytometer. For example, an event can pass through one or more gates and continue for possible counting after it meets the criteria of the gate(s). In more specific examples, a gate may be a predefined amount of side scatter intensity, a predefined amount of forward scatter intensity, and/or a predefined amount of light emitted in a fluorescence channel. As used herein, "gating," refers to use of gates (one-dimensional gates or two-dimensional gates) to exclude and/or isolate events of interest utilizing the same detection protocols. Gating as used in practicing various embodiments of the present disclosure can provide beneficial reduction of noise events or events that are not of interest in a flow cytometer assay. In some embodiments, the flow cytometry includes gating to select a basophil population having both high fluorescence indicative of CCR3-positive cells, and low side scatter. In some embodiments, the flow cytometry further includes gating to calculate the percentage of the basophil population having high fluorescence indicative of CD63-positive cells.

Activation Response

The activation response of a sample or a portion thereof to one or more chemical stimuli is generally a function of at least one of the one or more fluorescence intensities measured using the flow cytometry. In some embodiments, the function involves one or more fluorescence intensities measured at a single time. In some embodiments, the function involves one or more fluorescence intensities, at least one of which is measured at multiple (e.g., 2, 3, 4, 5, 6, 7, 8, 9, 10, or more than 10) times to create a time course measuring a change in fluorescence over time. In some embodiments, the function involves one or more fluorescence intensities measured with each of the one or more chemical stimuli independently having a single concentration. In some embodiments, the function involves one or more fluorescence intensities measured with at least one of the one or more chemical stimuli present in multiple (e.g., 2, 3, 4, 5, 6, 7, 8, 9, 10, or more than 10) concentrations to create a dose response curve measuring a change in fluorescence dependent on a stimulus concentration change.

In some embodiments, the function involves a basophil reactivity in response to the one or more chemical stimuli. The basophil reactivity can be the percentage of basophils exhibiting one or more fluorescence intensities above a lower gating limit in response to the chemical stimuli. The gating limit can be itself a function of the fluorescence intensities measured using a negative control and/or a positive control. The basophil reactivity can be the concentrations of the chemical stimuli at which the basophils exhibit a maximum in one or more of the one or more fluorescence intensities (e.g., the CDmax). In some embodiments, the function involves a basophil sensitivity in response to the one or more chemical stimuli. The basophil sensitivity can be the concentrations of the chemical stimuli at which the basophils exhibit 50% of their maximum in one or more of the one or more fluorescence intensities (e.g., the ED50). The basophil sensitivity can be a the slope of a dose response curve as described above. In some embodiments, the function involves a calculation of the area under a dose response curve (e.g., the AUC).

Exemplary Methods

FIG. 1 is a flowchart 100 illustrating an exemplary method for automated testing of a sample response to a chemical stimulus in accordance with certain embodiments. The method illustrated by flowchart 100 can be used to first test a sample using an intentionally high concentration of the chemical stimulus. In this way, a sample activation result lower than a preselected threshold unequivocally demonstrates that the sample is not responsive to the chemical stimulus. Alternatively, a sample activation result higher than the preselected threshold can automatically trigger a retest of the sample using a lower chemical stimulus concentration. As used herein, the terms ""automatically," automatic," "automated" and the like refer to operations performed without the direct intervention of a user. For example, in some embodiments provided computer systems can automatically, i.e., without direct user intervention, test a sample by measuring data associated with fluorescence intensities, analyze this data for determining a comparison between an activation response and a preselected threshold, and retest the sample if the determined comparison meets certain criteria.

At block 101 of the method, flow cytometry of a first portion of a sample is used to measure one or more fluorescence intensities. The measured fluorescence intensities are associated with activation of the first portion of the sample as induced by a first concentration of a chemical stimulus. In some embodiments, the sample includes whole blood, isolated peripheral blood mononuclear cells, or isolated basophils. In some embodiments, the chemical stimulus is an antigen. In some embodiments, the measuring includes contacting all of the first portion with one concentration of the chemical stimulus. In some embodiments, the measuring includes contacting each of multiple (e.g., 2, 3, 4, 5, 6, 7, 8, 9, 10, or more than 10) sub-portions of the first portion with a different concentration of the chemical stimulus, where the different concentrations are related to the first concentration. For example, the first concentration can be the minimum, the maximum, the mean, or the median of the different concentrations contacted with the sub-portions.

At block 102 of the method, the activation response of the first sample portion to the first chemical stimulus concentration is compared to a preselected threshold. This comparison is used to determine whether the activation response is greater than the threshold. The activation response is a function of the one or more fluorescence intensities measured at block 101 of the method. In some embodiments, the activation response is a function of the percentage of basophils exhibiting a fluorescence intensity above a gating limit.

At block 103 of the method, an operation is provided, such that the operation is configured to be performed if the determination in method block 102 concludes that the activation response is greater than the preselected threshold. In such cases, the provided operation uses flow cytometry of a second portion of the sample to quantify one or more fluorescence intensities. The quantified fluorescence intensities are associated with activation of the second portion of the sample as induced by a second concentration of the chemical stimulus. Because this second concentration is lower than the first concentration, an activation response associated with the quantified fluorescence intensities may differentiate between a true positive stimulus response test result and a false positive stimulus response test result as discussed above.

It is noted that although though flowchart 100 illustrates the exemplary method as being sequential, some depicted operations can be performed in parallel or concurrently. In addition, the order of some operations can be rearranged. An operation can also have additional steps not included in the flowchart. Some operations can be optional, and thus can be omitted in various embodiments. Furthermore, some elements described in one block can be performed together with elements described in another block. The operations of the method can be performed iteratively, such that increasingly lower concentrations of the chemical stimulus are tested. The number of permitted iterations, as well as the chemical stimulus concentration difference between iterations, can be predetermined or selected based on user input. Elements of the method can be implemented in hardware, software, firmware, middleware, microcode, hardware description languages, or any combination thereof.

Figure 2:
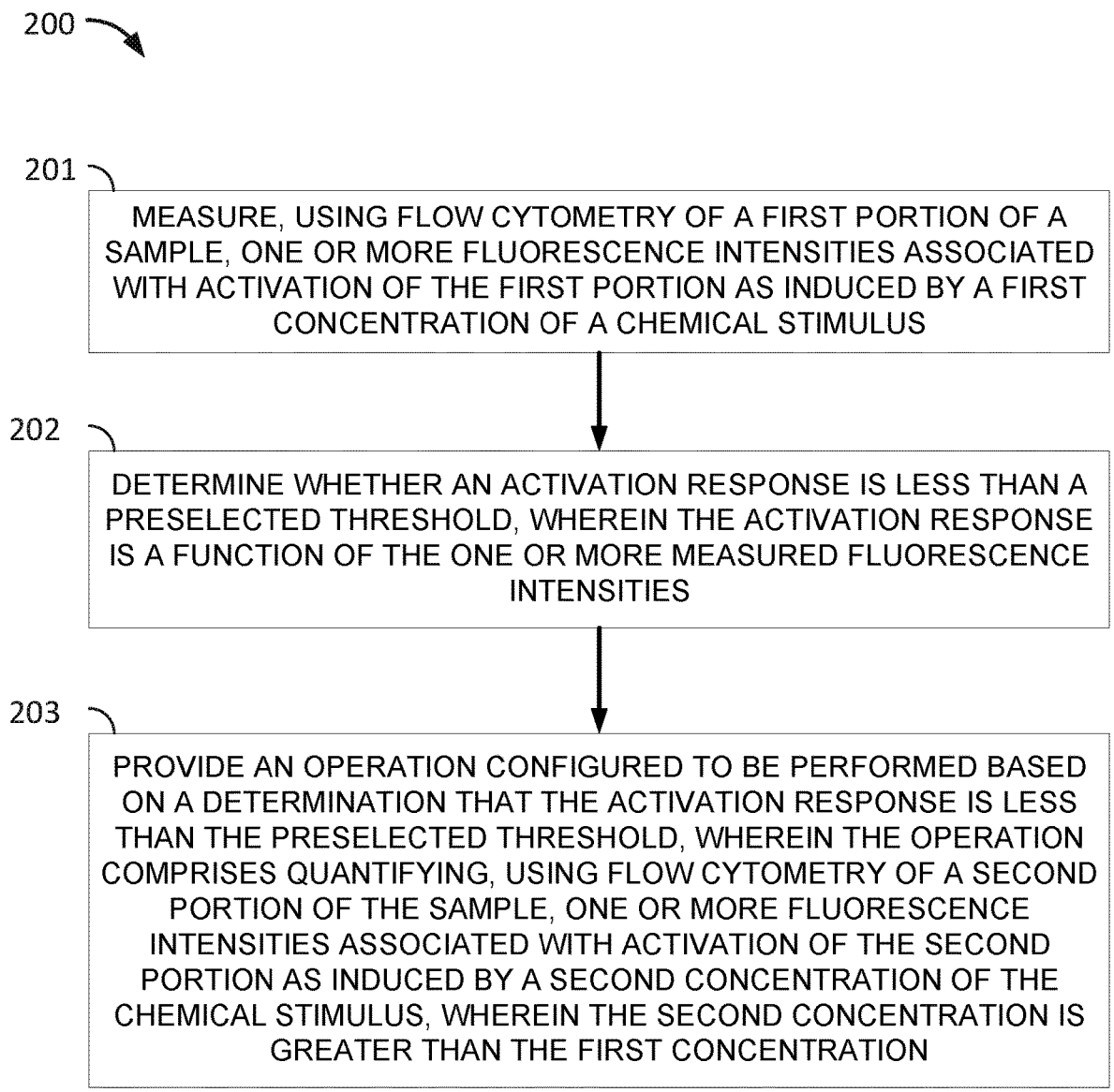
FIG. 2 is a flowchart of a method in accordance with a provided embodiment for the automated testing of a sample response to a chemical stimulus beginning at a low concentration.

FIG. 2 is a flowchart 200 illustrating an exemplary method for another automated testing of a sample response to a chemical stimulus in accordance with certain embodiments. The method illustrated by flowchart 200 can be used to first test a sample using an intentionally low concentration of the chemical stimulus. In this way, a sample activation result higher than a preselected threshold unequivocally demonstrates that the sample is responsive to the chemical stimulus. Alternatively, a sample activation result lower than the preselected threshold can automatically trigger a retest of the sample using a higher chemical stimulus concentration.

At block 201 of the method, flow cytometry of a first portion of a sample is used to measure one or more fluorescence intensities. The measured fluorescence intensities are associated with activation of the first portion of the sample as induced by a first concentration of a chemical stimulus. In some embodiments, the sample includes whole blood, isolated peripheral blood mononuclear cells, or isolated basophils. In some embodiments, the chemical stimulus is an antigen. In some embodiments, the measuring includes contacting all of the first portion with one concentration of the chemical stimulus. In some embodiments, the measuring includes contacting each of multiple (e.g., 2, 3, 4, 5, 6, 7, 8, 9, 10, or more than 10) sub-portions of the first portion with a different concentration of the chemical stimulus, where the different concentrations are related to the first concentration. For example, the first concentration can be the minimum, the maximum, the mean, or the median of the different concentrations contacted with the sub-portions.

At block 202 of the method, the activation response of the first sample portion to the first chemical stimulus concentration is compared to a preselected threshold. This comparison is used to determine whether the activation response is less than the threshold. The activation response is a function of the one or more fluorescence intensities measured at block 201 of the method. In some embodiments, the activation response is a function of the percentage of basophils exhibiting a fluorescence intensity above a gating limit.

At block 203 of the method, an operation is provided, such that the operation is configured to be performed if the determination in method block 202 concludes that the activation response is less than the preselected threshold. In such cases, the provided operation uses flow cytometry of a second portion of the sample to quantify one or more fluorescence intensities. The quantified fluorescence intensities are associated with activation of the second portion of the sample as induced by a second concentration of the chemical stimulus. Because this second concentration is higher than the first concentration, an activation response associated with the quantified fluorescence intensities may differentiate between a true negative stimulus response test result and a false negative stimulus response test result as discussed above.

It is noted that although though flowchart 200 illustrates the exemplary method as being sequential, some depicted operations can be performed in parallel or concurrently. In addition, the order of some operations can be rearranged. An operation can also have additional steps not included in the flowchart. Some operations can be optional, and thus can be omitted in various embodiments. Furthermore, some elements described in one block can be performed together with elements described in another block. The operations of the method can be performed iteratively, such that increasingly higher concentrations of the chemical stimulus are tested. The number of permitted iterations, as well as the chemical stimulus concentration difference between iterations, can be predetermined or selected based on user input.

Elements of the method can be implemented in hardware, software, firmware, middleware, microcode, hardware description languages, or any combination thereof.

Sample Lysis

In some embodiments, the sample is contacted with a lysing reagent prior to the flow cytometry of the sample, and prior to the addition of the chemical stimulus, antibodies, control markers, and/or other reagents. In conventional basophil activation tests, sample lysis is typically performed after the addition these components. This technique can be disadvantaged for at least two reasons. First, if an additional test of the sample is required, for example if an initial sample test generates equivocal activation response results, then additional time and resources must be spent to repeat sample lysis prior to this additional test. Second, if multiple test samples are prepared in anticipation of a test repeat that subsequently is deemed unnecessary, then the chemical stimulus, antibodies, control markers, and/or reagents added to these additional unused test samples are lost.

In contrast, the provided approach of performing sample lysis prior to reagent addition and flow cytometry has advantages of creating a sample stock that is ready to be accessed if the automated method determines that additional tests should be run. In such a case, the chemical stimulus, antibodies, control markers, and/or other reagents can be added to the already lysed sample for performing these additional tests. This process improvement can therefore yield potentially significant time, resource, and cost savings.

Automated Stimulus Panel Testing Methods

In another aspect, a method for automated testing of a sample response to a panel of chemical stimuli is disclosed. In many applications of stimulus response tests, it is desired to understand how a particular sample responds to not one, but multiple types or species of chemical stimuli. As an example, when an allergy test such as a basophil activation test is administered to a sample obtained from a subject, the test typically involves interrogating the sample with a panel of several allergens to identify which of these produce an allergic reaction in the subject.

Figure 3:
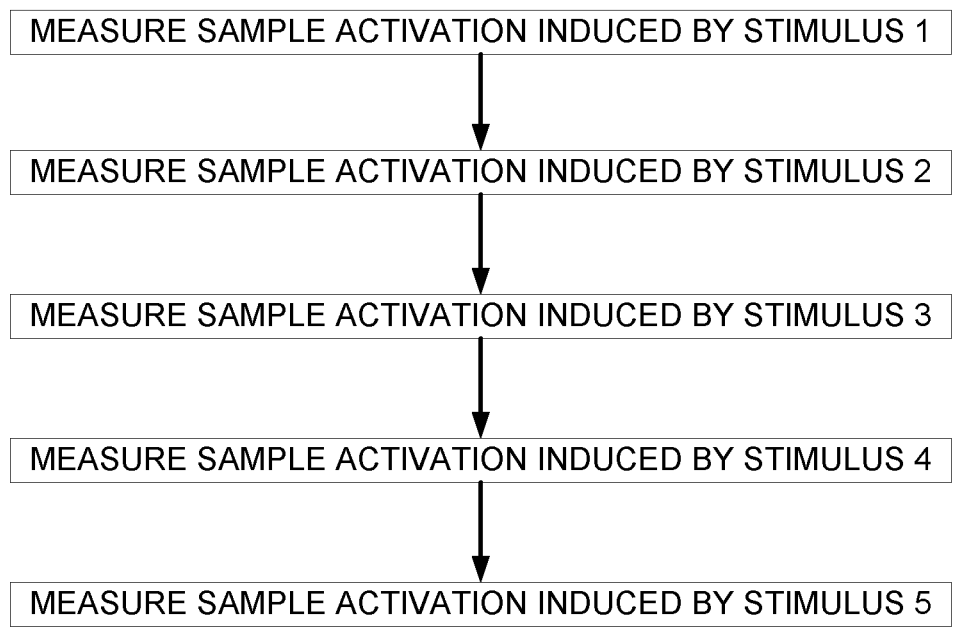
FIG. 3 is a flowchart of a comparative process for the testing of a sample response to a panel of five chemical stimuli.

FIG. 3 presents an exemplary flowchart of a conventionally administered stimulus response test investigating the response of a sample to a panel of five chemical stimuli. As shown in the flowchart, each of the different stimuli of the panel is tested individually in a sequential manner. A result of this process architecture is that the operation of measuring the activation response of the sample must be repeated five times. Each of these operations consumes material in the form of the sample and reagents including antibodies and control markers as described above. Furthermore, each of the repeated operations has a time-associated cost that can be significant.

Figure 4:
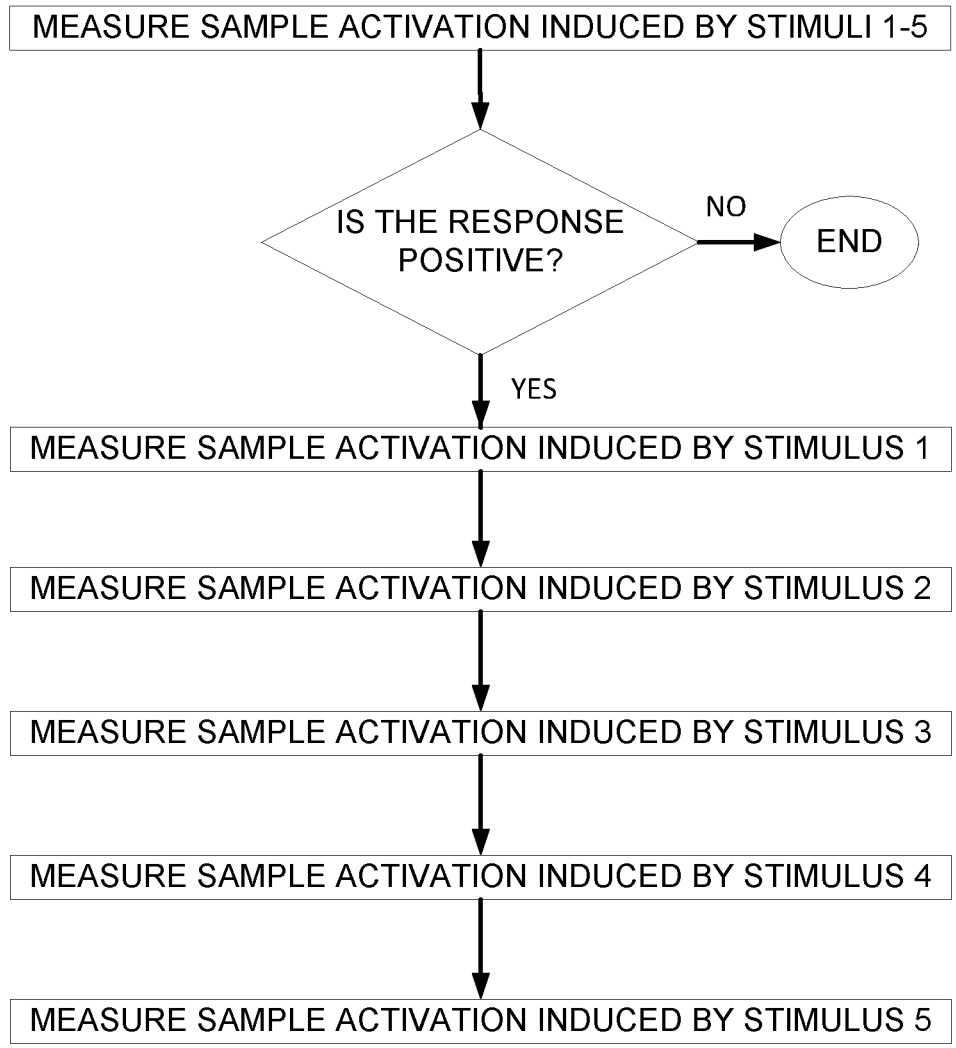
FIG. 4 is a flowchart of a process as provided herein for the testing of a sample response to a panel of five chemical stimuli.

To address these potential inefficiencies, the provided method can perform a first measurement (e.g., an initial measurement) of a sample response to a combination of all chemical stimuli of the panel. As shown in the flowchart of FIG. 4, when a panel includes five chemical stimuli, the first measurement operation tests for activation of a sample response as induced by a mixture of all five of these stimuli. In the relatively common occurrence that none of the five stimuli generate an activation response greater than a preselected threshold, the automated method then triggers an end to the testing. Only if there is an activation response greater than the threshold are the different stimuli of the panel tested individually in a sequential manner as in FIG. 3. As a result, for a panel having n different chemical stimuli, there may be a total of n+1 measurement operations carried out, representing a slight inefficiency as compared to the conventional approach of FIG. 3. This possibility is outweighed, however, but the likelihood that no stimulus of the panel will activate a response, and that only one measurement operation will be carried out.

Figure 5:
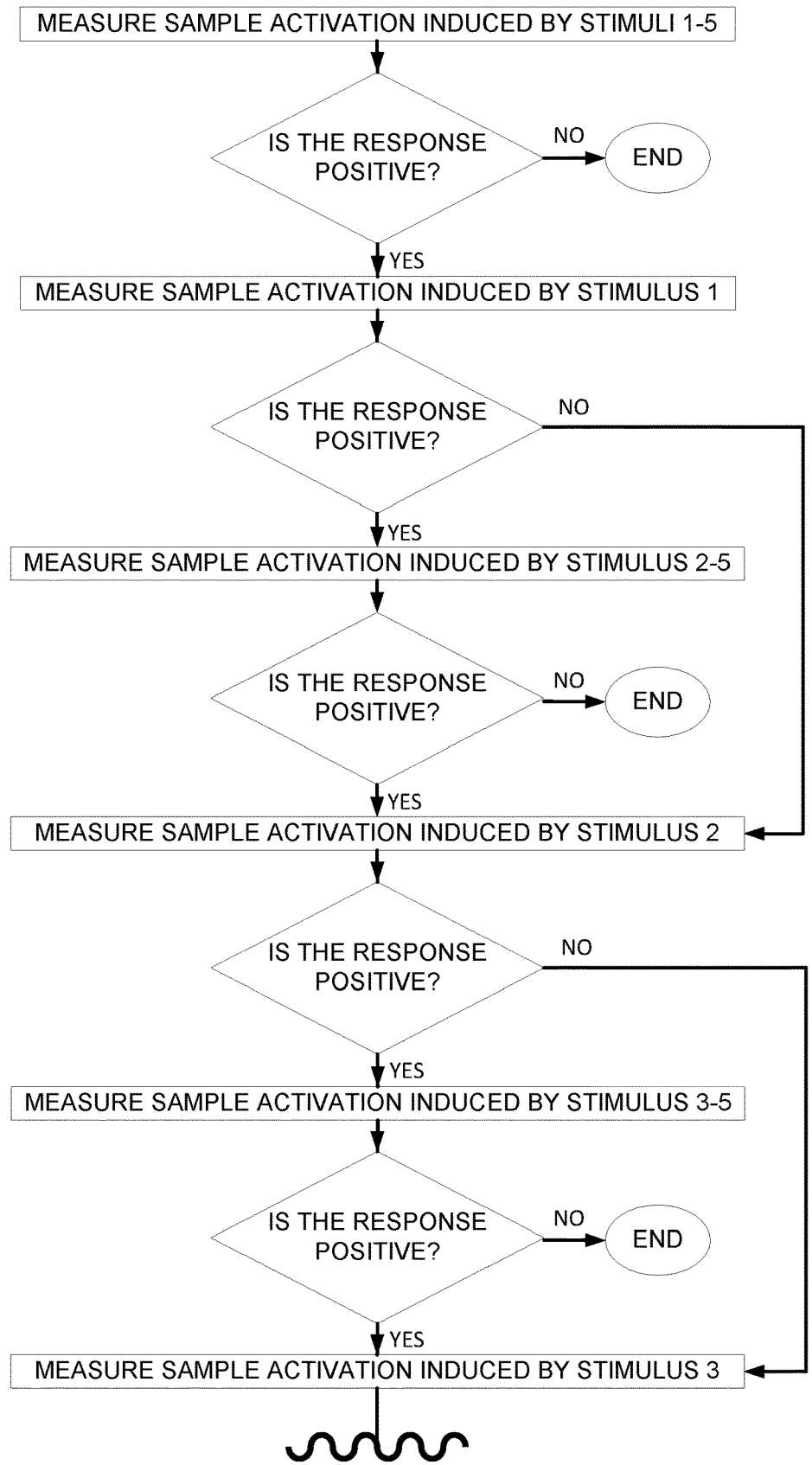
FIG. 5 is a flowchart of a process as provided herein for the testing of a sample response to a panel of five chemical stimuli.
Figure 5:
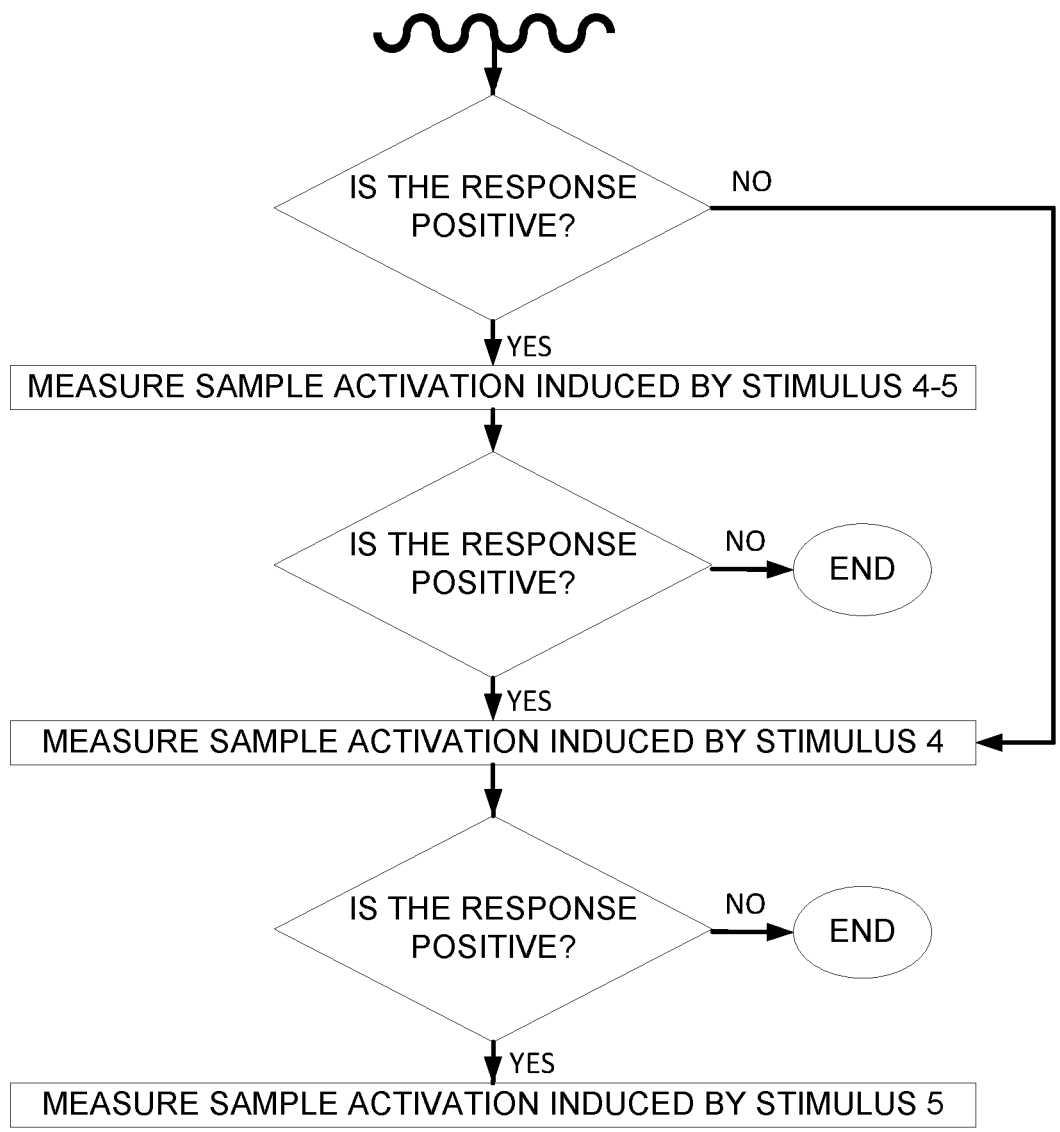

FIG. 5 presents a flowchart with a further enhancement to the provided method. In the first operation of FIG. 5, as in that of FIG. 4, a measurement is taken of the activation response of a sample to a mixture of all five stimuli in a panel. Also as in FIG. 4, the process of FIG. 5 automatically ends if the first measurement fails to generate an activation response greater than a preselected threshold, and automatically tests one member of the stimulus panel if an activation response greater than the threshold is detected. The next member of the stimulus panel is tested only if this second measurement yields a negative result, however. Otherwise, another combination of the remaining stimuli is tested to again see if the process can be terminated before each of these remaining stimuli need to be tested individually. This basic branching structure is repeated throughout the remainder of the flowchart, such for each positive activation response measured for an individual stimulus, the remaining stimuli that have not been tested individually are first tested in a combination.

As with the provided automated method illustrated in FIG. 4, the automated method of FIG. 5 provides a clear efficiency gain in the event that no member of a chemical stimulus panel generates a positive sample activation response, as only a single measurement operation will be performed. Moreover, the FIG. 5 method can also provide an efficiency gain in most cases where only one member of the panel generates a positive response. In considering all possible outcomes varying which member of a panel of size n generates the positive response, the minimum number of measurement operations required to identify this panel member and its uniquely positive result is 3, and the maximum is n+1. Averaging all possibilities shows the average number of measurement operations in this case to be:

$$\left[n + \sum_{i=1}^{n-1}(n+2)\right]/n$$

For all cases in which n>4, therefore, the FIG. 5 process will also on average provide an efficiency gain when only one member of chemical stimulus panel induces a positive sample activation response.

Figure 6:
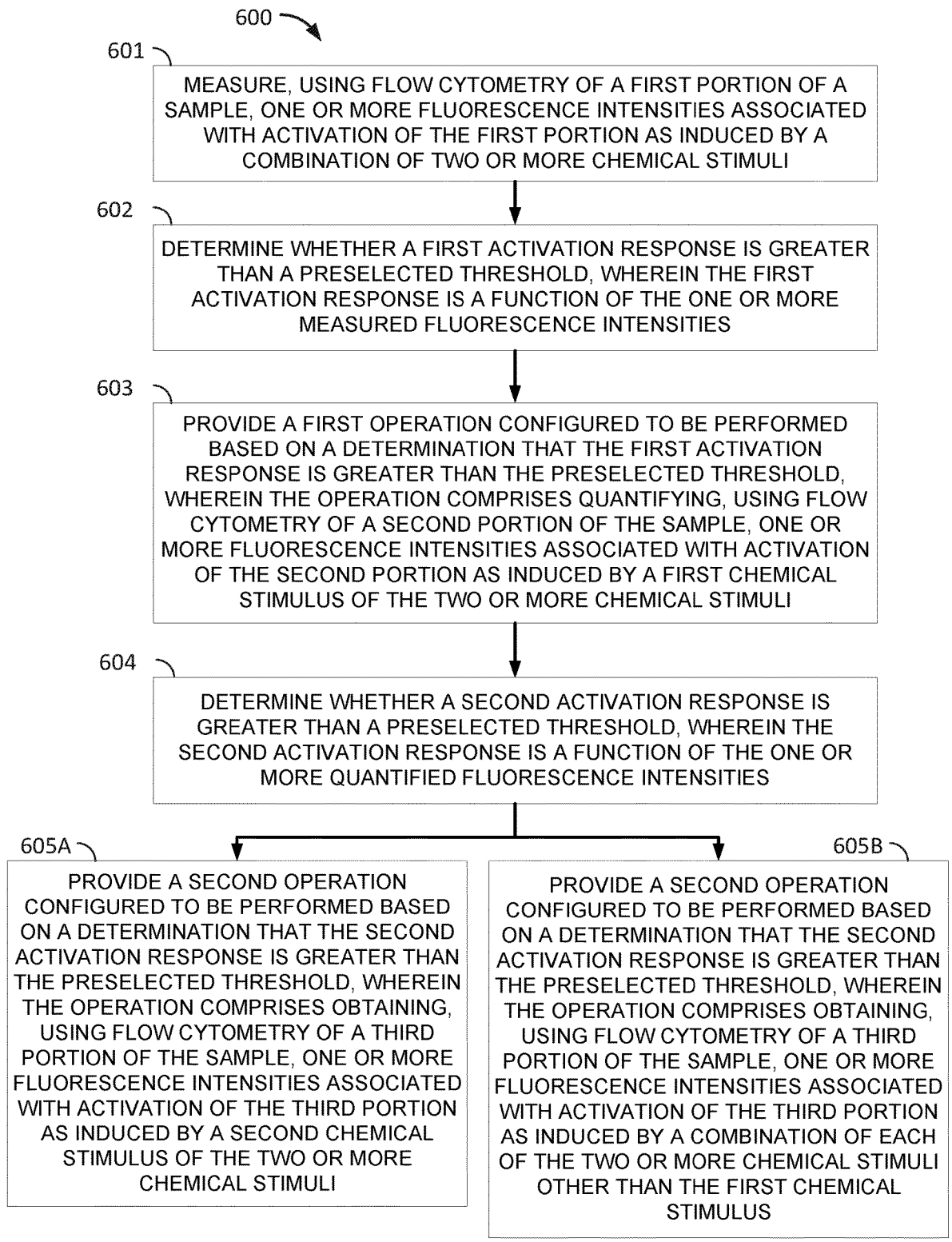
FIG. 6 is a flowchart of a method in accordance with provided embodiments for the automated testing of a sample response to a panel of chemical stimuli.

FIG. 6 is a flowchart 600 illustrating an exemplary method for automated testing of a sample response to a chemical stimulus panel in accordance with certain embodiments. The method illustrated by flowchart 600 can be used to first test a sample using combination of all chemical stimuli in the panel. In this way, a sample activation result lower than a preselected threshold demonstrates that the sample is not responsive to any chemical stimulus in the panel. Alternatively, a sample activation result higher than the preselected threshold can automatically trigger a retest of one individual member of the panel.

At block 601 of the method, flow cytometry of a first portion of a sample is used to measure one or more fluorescence intensities. The measured fluorescence intensities are associated with activation of the first portion of the sample as induced by a combination of two or more chemical stimuli. In some embodiments, the sample includes whole blood, isolated peripheral blood mononuclear cells, or isolated basophils. In some embodiments, each chemical stimuli is independently an antigen. In some embodiments, the measuring includes contacting all of the first portion with one concentration of chemical stimulus combination. In some embodiments, the measuring includes contacting each of multiple (e.g., 2, 3, 4, 5, 6, 7, 8, 9, 10, or more than 10) sub-portions of the first portion with a different concentration of the chemical stimulus combination.

At block 602 of the method, the activation response of the first sample portion is compared to a preselected threshold. This comparison is used to determine whether the activation response is greater than the threshold. The activation response is a function of the one or more fluorescence intensities measured at block 601 of the method. In some embodiments, the activation response is a function of the percentage of basophils exhibiting a fluorescence intensity above a gating limit.

At block 603 of the method, a first operation is provided, such that the operation is configured to be performed if the determination in method block 602 concludes that the activation response is greater than the preselected threshold. In such cases, the provided operation uses flow cytometry of a second portion of the sample to quantify one or more fluorescence intensities. The quantified fluorescence intensities are associated with activation of the second portion of the sample as induced by a first chemical stimulus of the two or more chemical stimuli.

At block 604 of the method, the activation response of the second sample portion is compared to a preselected threshold. This comparison is used to determine whether the activation response is greater than the threshold. The activation response is a function of the one or more fluorescence intensities quantified at block 603 of the method. In some embodiments, the activation response is a function of the percentage of basophils exhibiting a fluorescence intensity above a gating limit.

At block 605A of the method, a second operation is provided in accordance with the embodiment illustrated in FIG. 4. This second operation is configured to be performed if the determination in method block 604 concludes that the activation response is greater than the preselected threshold. In such cases, the provided second operation uses flow cytometry of a third portion of the sample to obtain one or more fluorescence intensities. The obtained fluorescence intensities are associated with activation of the third portion of the sample as induced by a second chemical stimulus of the two or more chemical stimuli.

At block 605B of the method, an alternative second operation is provided in accordance with the embodiment illustrated in FIG. 5. This alternative second operation is configured to be performed if the determination in method block 605 concludes that the activation response is greater than the preselected threshold. In such cases the provided alternative second operation uses flow cytometry of a third portion of the sample to obtain one or more fluorescence intensities. The obtained fluorescence intensities are associated with activation of the third portion of the sample as induced by a combination of each of the two or more chemical stimuli of the panel other than the first chemical stimulus.

It is noted that although though flowchart 600 illustrates the exemplary method as being sequential, some depicted operations can be performed in parallel or concurrently. In addition, the order of some operations can be rearranged. An operation can also have additional steps not included in the flowchart. Some operations can be optional, and thus can be omitted in various embodiments. Furthermore, some elements described in one block can be performed together with elements described in another block. Elements of the method can be implemented in hardware, software, firmware, middleware, microcode, hardware description languages, or any combination thereof.

Systems

Figure 7:
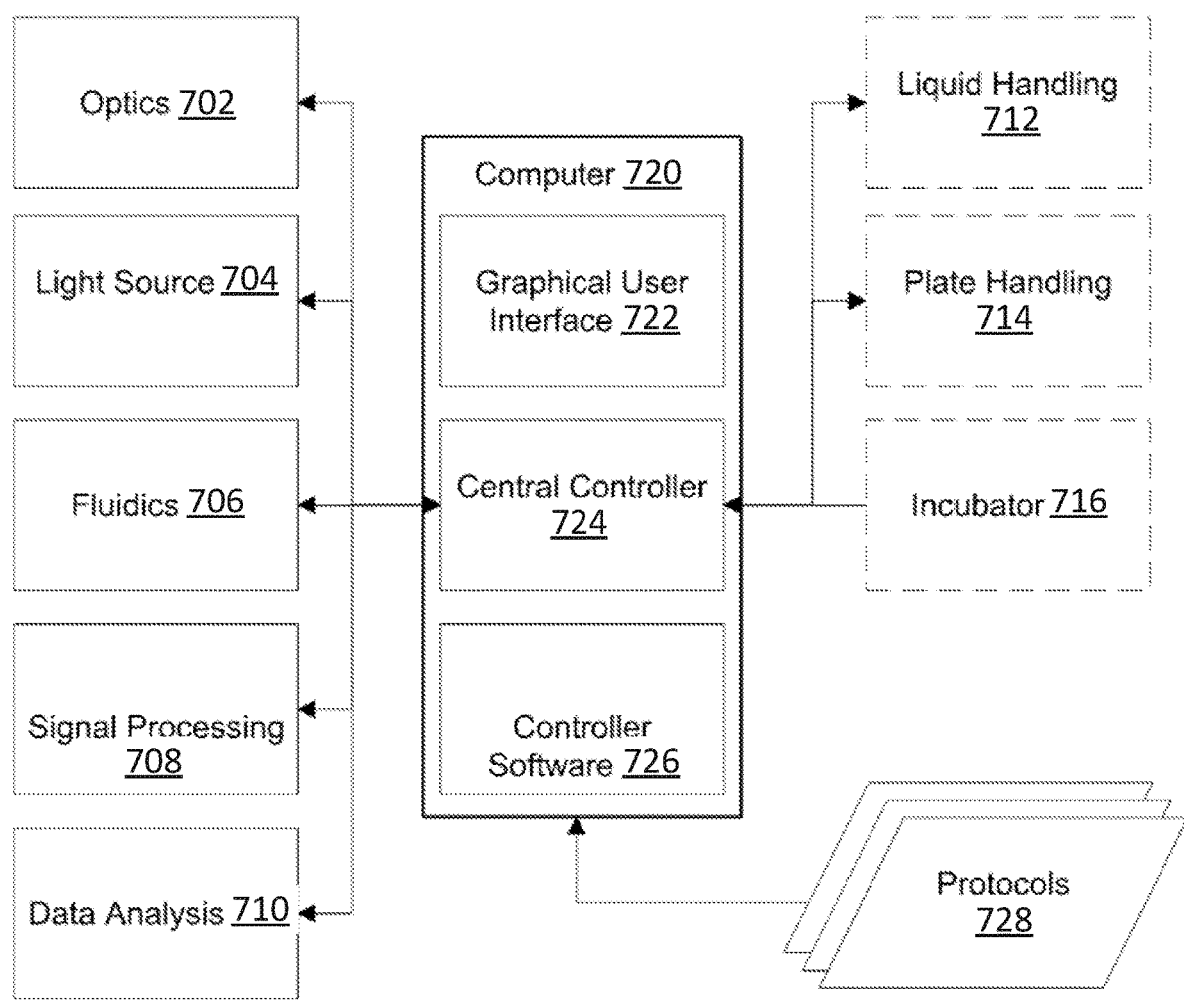
FIG. 7 is a schematic illustration of flow cytometry system components suitable for use with the methods and systems provided herein.

Also provided are systems for performing any of the methods disclosed herein. In some embodiments, the systems include a flow cytometer. FIG. 7 presents a schematic illustration of a flow cytometer and associated components suitable for use with the provided methods and systems. In FIG. 7, a flow cytometry machine 700 is shown having an optics component 702, a light source component 704, a fluidics component 706, a signal processing module 708, and a data analysis module 710. The flow cytometry machine 700 can also include optional components, such as a liquid handling component 712, a plate handling component 714, and an incubator 716. These components can be communicatively coupled to a central controller 724 of a computer 720 of the flow cytometry machine 700. The central controller 724 can control the various components of the flow cytometry machine 700. There can be controller software 726 that runs on computer 720 that can be executed by the central controller 724. The controller software 726 can receive input from one or more protocols 728, which provide a set of procedures or a workflow for the flow cytometry machine 700 to perform. Accordingly, the central controller 724 and the controller software 726 can be used in combination to execute the instructions in the one or more protocols 728 in order to control the various components of the flow cytometry machine 700. In some embodiments, there can be a graphical user interface 722 displayed on the computer 720, which allows a user (not shown) to interact with the flow cytometry machine 700. For example, the user can be able to use the graphical user interface 722 to select and configure the one or more protocols 728 or to view the analysis results produced by the flow cytometry machine 700.

In some embodiments, the fluidics component 706 can be referred to as a flow cell. If the flow cytometry machine 700 is tasked with analyzing a sample of cells suspended in fluid, the flow cell can carry and align the cells in the sample so that they pass single file through a light beam (such as the light source component 704) for sensing. In other words, the cells can be placed into a single-file line in order to facilitate counting and analysis of the cells.

In some embodiments, the light source component 704 can be any component capable of producing light signals. For example, in some embodiments, the light source component 704 can be a laser, while in other embodiments, the light source component 704 can be a lamp. The optics component 702 can be configured to focus the light signals for detection, which are amplified and processed by the signal processing module 708. The data analysis module 710 then performs analysis on the processed signals in order to produce quantified metrics that can be understood by a user. In some embodiments, the functions of the signal processing module 708 and/or the data analysis module 710 can be performed by one or more components of the computer 720.

In some embodiments, the flow cytometry machine 700 can optionally include a liquid handling component 712, a plate handling component 714, and an incubator 716, which serve to expand the functionality and operations that can be performed by the flow cytometry machine 700. Examples of such components include the Stratedigm A600 High Throughput Auto Sampler (HTAS), the Stratedigm A700 High Throughput Hotel (HTH), and the Stratedigm A800 Cell Incubator (CI). These components can be used with a Stratedigm S1000Exi/SE520EXi flow cytometer for added functionality and implement more of the protocol instructions described herein. For example, these components can allow the flow cytometry machine 700 to automatically perform analysis using samples that are stored in the wells of a plate, which can be taken out of the incubator at a specified time.

In some embodiments, the system further comprises one or more components for collecting samples from subjects. For example, the system can include containers for a surfactant, a washing agent, and/or a media for transporting the test samples. The system can also include components suitable for performing sample preparation steps, such as dilutions, concentrations, centrifugation, incubation, and lysis.

In some embodiments, the provided methods are performed using a system (e.g., the Shero Diagnostics platform) that employs a fully automated, robotic architecture, with an easily programmable interface and Boolean logic. Exemplary components of these systems are disclosed in U.S. Pat. No. 10,338,897, the contents of which are incorporated by reference herein.

Figure 8:
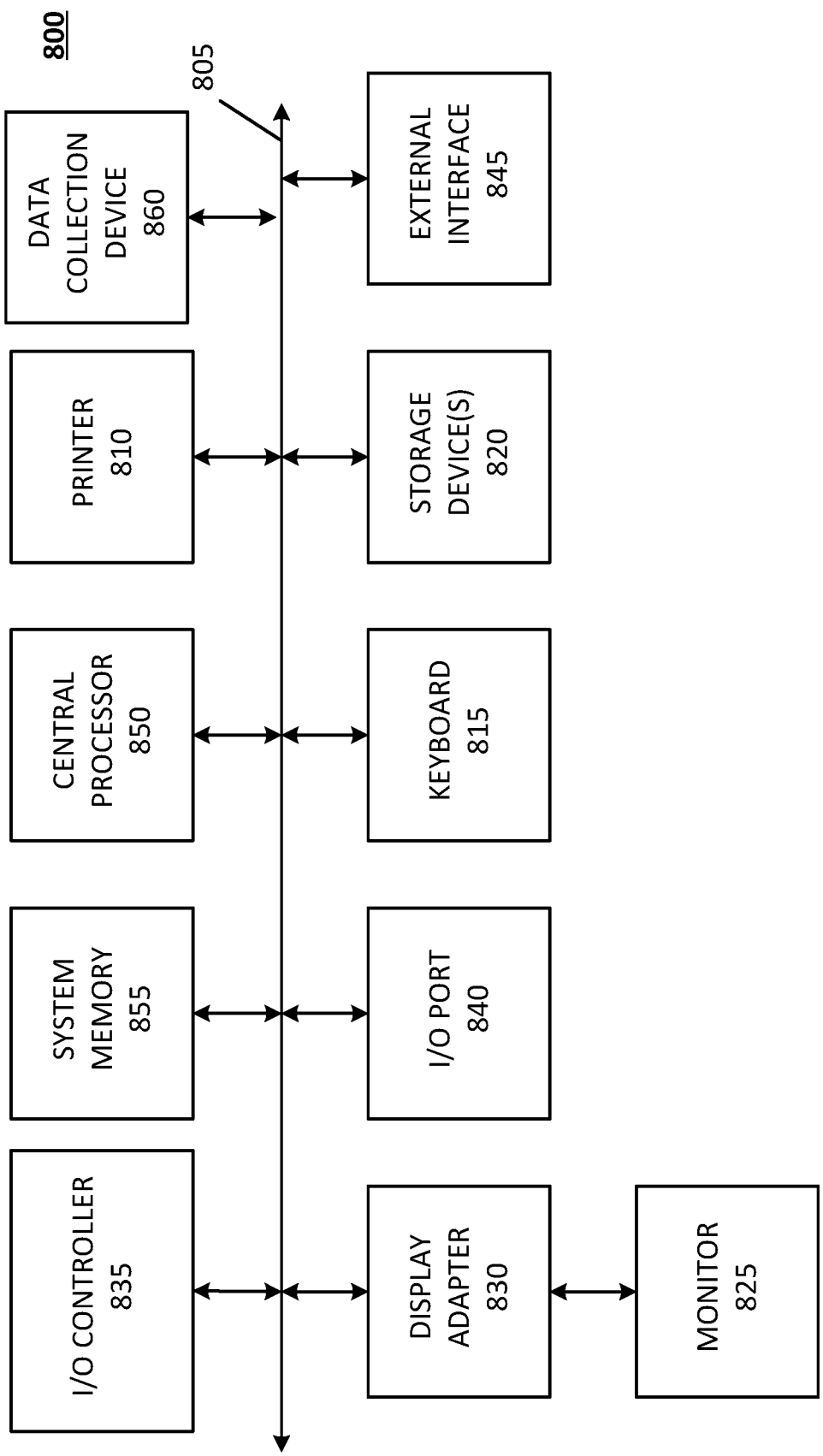
FIG. 8 is a schematic illustration of computer system components suitable for use with the methods and systems provided herein.

The provided computer systems can utilize any suitable number of subsystems. Examples of such subsystems are shown in FIG. 8 in computer system 800. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones, and other mobile devices.

The subsystems shown in FIG. 8 are interconnected via a system bus 805. Additional subsystems such as a printer 810, keyboard 815, storage device(s) 820, monitor 825, which is coupled to display adapter 830, and others are shown. Peripherals and input/output (I/O) devices, which couple to I/O controller 835, can be connected to the computer system by any number of means known in the art such as input/output (I/O) port 840 (e.g., USB, FIRE-WIRE®). For example, I/O port 840 or external interface 845 (e.g. Ethernet, Wi-Fi, etc.) can be used to connect computer system 800 to a wide area network such as the Internet, a mouse input device, or a scanner. The interconnection via system bus 805 allows the central processor 850 to communicate with each subsystem and to control the execution of a plurality of instructions from system memory 855 or the storage device(s) 820 (e.g., a fixed disk, such as a hard drive, or optical disk), as well as the exchange of information between subsystems. The system memory 855 and/or the storage device(s) 820 can embody a computer readable medium. Another subsystem is a data collection device 860, such as a flow cytometer, a camera, microphone, accelerometer, and the like. Any of the data mentioned herein can be output from one component to another component and can be output to the user.

A computer system can include a plurality of the same components or subsystems, e.g., connected together by external interface 845, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of the provided embodiments can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium can be any combination of such storage or transmission devices.

Such programs may also be encoded and transmitted using carrier signals adapted for transmission via wired, optical, and/or wireless networks conforming to a variety of protocols, including the Internet. As such, a computer readable medium can be created using a data signal encoded with such programs. Computer readable media encoded with the program code can be packaged with a compatible device or provided separately from other devices (e.g., via Internet download). Any such computer readable medium can reside on or within a single computer product (e.g. a hard drive, a CD, or an entire computer system), and can be present on or within different computer products within a system or network. A computer system can include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps can be used with portions of other steps from other methods. Also, all or portions of a step may be optional. Additionally, any of the steps of any of the methods can be performed with modules, units, circuits, or other means for performing these steps.

EMBODIMENTS

The following embodiments are contemplated. All combinations of features and embodiments are contemplated.

Embodiment 1: A method for automated testing of a sample response to a chemical stimulus, the method comprising: measuring, using flow cytometry of a first portion of the sample, one or more fluorescence intensities associated with activation of the first portion as induced by a first concentration of the chemical stimulus; determining, using a computer system, whether an activation response is greater than a preselected threshold, wherein the activation response is a function of the one or more measured fluorescence intensities; and providing an operation configured to be automatically performed by the computer system based on a determination that the activation response is greater than the preselected threshold, wherein the operation comprises: quantifying, using flow cytometry of a second portion of the sample, one or more fluorescence intensities associated with activation of the second portion as induced by a second concentration of the chemical stimulus, wherein the second concentration is lower than the first concentration.

Embodiment 2: An embodiment of embodiment 1, further comprising: prior to the measuring step, receiving user input selecting the first concentration of the chemical stimulus.

Embodiment 3: An embodiment of embodiment 1 or 2, further comprising: prior to the determining step, receiving user input assigning a value to the preselected threshold.

Embodiment 4: An embodiment of any of the embodiments of embodiment 1-3, wherein the activation of the first portion of the sample comprises activation of basophils within the first portion, and wherein the activation of the second portion of the sample comprises activation of basophils within the second portion.

Embodiment 5: An embodiment of any of the embodiments of embodiment 1-4, further comprising: prior to the flow cytometry, treating the sample with a lysing reagent.

Embodiment 6: An embodiment of any of the embodiments of embodiment 1-5, wherein the flow cytometry of the sample comprises contacting the sample with antibodies to one or more activation markers.

Embodiment 7: An embodiment of embodiment 6, wherein the one or more activation markers are each independently selected from the group consisting of CD63, CD107a, CD1076, CD13, CD164, CD69, p38 MAPK, and STAT5.

Embodiment 8: An embodiment of any of the embodiments of embodiment 1-7, wherein the flow cytometry of the sample comprises contacting the sample with antibodies to one or more identification markers.

Embodiment 9: An embodiment of embodiment 8, wherein the one or more identification markers are each independently selected from the group consisting of CCR3, CD203c, CD123, IgE, and CRTH2.

Embodiment 10: An embodiment of any of the embodiments of embodiment 1-9, wherein the flow cytometry comprises contacting the sample with one or more control markers.

Embodiment 11: An embodiment of embodiment 10, wherein the control markers are selected from the group consisting of anti-FcεRI and fMLP.

Embodiment 12: An embodiment of any of the embodiments of embodiment 1-11, wherein the flow cytometry comprises contacting the sample with one or more buffer reagents selected from the group consisting of IL-3, heparin, and calcium.

Embodiment 13: An embodiment of any of the embodiments of embodiment 1-12, wherein the sample comprises whole blood or isolated peripheral blood mononuclear cells.

Embodiment 14: An embodiment of any of the embodiments of embodiment 1-13, wherein the chemical stimulus comprises an allergen.

Embodiment 15: A method for automated testing of a sample response to a chemical stimulus, the method comprising: measuring, using flow cytometry of a first portion of the sample, one or more fluorescence intensities associated with activation of the first portion as induced by a first concentration of the chemical stimulus; determining, using a computer system, whether an activation response is less than a preselected threshold, wherein the activation response is a function of the one or more measured fluorescence intensities; and providing an operation configured to be automatically performed by the computer system based on a determination that the activation response is less than the preselected threshold, wherein the operation comprises: quantifying, using flow cytometry of a second portion of the sample, one or more fluorescence intensities associated with activation of the second portion as induced by a second concentration of the chemical stimulus, wherein the second concentration is greater than the first concentration Embodiment 16: An embodiment of embodiment 15, further comprising: prior to the measuring step, receiving user input selecting the first concentration of the chemical stimulus.

Embodiment 17: An embodiment of embodiment 15 or 16, further comprising: prior to the determining step, receiving user input assigning a value to the preselected threshold.

Embodiment 18: An embodiment of any of the embodiments of embodiment 15-17, wherein the activation of the first portion of the sample comprises activation of basophils within the first portion, and wherein the activation of the second portion of the sample comprises activation of basophils within the second portion.

Embodiment 19: An embodiment of any of the embodiments of embodiment 15-18, further comprising: prior to the flow cytometry, treating the sample with a lysing reagent.

Embodiment 20: An embodiment of any of the embodiments of embodiment 15-19, wherein the flow cytometry of the sample comprises contacting the sample with antibodies to one or more activation markers.

Embodiment 21: An embodiment of embodiment 20, wherein the one or more activation markers are each independently selected from the group consisting of CD63, CD107a, CD107b, CD13, CD164, CD69, p38 MAPK, and STAT5.

Embodiment 22: An embodiment of any of the embodiments of embodiment 15-21, wherein the flow cytometry of the sample comprises contacting the sample with antibodies to one or more identification markers.

Embodiment 23: An embodiment of embodiment 22, wherein the one or more identification markers are each independently selected from the group consisting of CCR3, CD203c, CD123, IgE, and CRTH2.

Embodiment 24: An embodiment of any of the embodiments of embodiment 15-23, wherein the flow cytometry comprises contacting the sample with one or more control markers.

Embodiment 25: An embodiment of embodiment 24, wherein the control markers are selected from the group consisting of anti-FcεRI and fMLP Embodiment 26: An embodiment of any of the embodiments of embodiment 15-25, wherein the flow cytometry comprises contacting the sample with one or more buffer reagents selected from the group consisting of IL-3, heparin, and calcium.

Embodiment 27: An embodiment of any of the embodiments of embodiment 15-26, wherein the sample comprises whole blood or isolated peripheral blood mononuclear cells.

Embodiment 28: An embodiment of any of the embodiments of embodiment 15-27, wherein the chemical stimulus comprises an allergen.

Embodiment 29: A method for automated testing of a sample response to a panel of chemical stimuli, the method comprising: measuring, using flow cytometry of a first portion of the sample, one or more fluorescence intensities associated with activation of the first portion as induced by a combination of two or more chemical stimuli; determining, using a computer system, whether a first activation response is greater than a preselected threshold, wherein the first activation response is a function of the one or more measured fluorescence intensities; providing a first operation configured to be automatically performed by the computer system based on a determination that the first activation response is greater than the preselected threshold, wherein the operation comprises: quantifying, using flow cytometry of a second portion of the sample, one or more fluorescence intensities associated with activation of the second portion as induced by a first chemical stimulus of the two or more chemical stimuli.

Embodiment 30: An embodiment of embodiment 29, further comprising: determining, using the computer system, whether a second activation response is greater than the preselected threshold, wherein the second activation response is a function of the one or more quantified fluorescence intensities; and providing a second operation configured to be automatically performed by the computer system based on a determination that the second activation response is greater than the preselected threshold, wherein the operation comprises: obtaining, using flow cytometry of a third portion of the sample, one or more fluorescence intensities associated with activation of the third portion as induced by a combination of each of the two or more chemical stimuli other than the first chemical stimulus.

Embodiment 31: An embodiment of any of the embodiments of embodiment 29, further comprising: determining, using the computer system, whether a second activation response is greater than the preselected threshold, wherein the second activation response is a function of the one or more quantified fluorescence intensities; and providing a second operation configured to be automatically performed by the computer system based on a determination that the second activation response is greater than the preselected threshold, wherein the operation comprises: obtaining, using flow cytometry of a third portion of the sample, one or more fluorescence intensities associated with activation of the third portion as induced by a second chemical stimulus of the two or more chemical stimuli other than the first chemical stimulus.

Embodiment 32: An embodiment of any of the embodiments of embodiment 29-31, further comprising: prior to the measuring step, receiving user input selecting the first concentration of the chemical stimulus.

Embodiment 33: An embodiment of any of the embodiments of embodiment 29-32, further comprising: receiving user input assigning a value to the preselected threshold.

Embodiment 34: An embodiment of any of the embodiments of embodiment 29-33, wherein the activation of the first portion of the sample comprises activation of basophils within the first portion, and wherein the activation of the second portion of the sample comprises activation of basophils within the second portion.

Embodiment 35: An embodiment of any of the embodiments of embodiment 29-34, further comprising: prior to the flow cytometry, treating the sample with a lysing reagent.

Embodiment 36: An embodiment of any of the embodiments of embodiment 29-35, wherein the flow cytometry of the sample comprises contacting the sample with antibodies to one or more activation markers.

Embodiment 37: An embodiment of embodiment 36, wherein the one or more activation markers are each independently selected from the group consisting of CD63, CD107a, CD107b, CD13, CD164, CD69, p38 MAPK, and STAT5.

Embodiment 38: An embodiment of any of the embodiments of embodiment 29-37, wherein the flow cytometry of the sample comprises contacting the sample with antibodies to one or more identification markers.

Embodiment 39: An embodiment of embodiment 38, wherein the one or more identification markers are each independently selected from the group consisting of CCR3, CD203c, CD123, IgE, and CRTH2.

Embodiment 40: An embodiment of any of the embodiments of embodiment 29-39, wherein the flow cytometry comprises contacting the sample with one or more control markers.

Embodiment 41: An embodiment of embodiment 40, wherein the control markers are selected from the group consisting of anti-FcεRI and fMLP.

Embodiment 42: An embodiment of any of the embodiments of embodiment 29-41, wherein the flow cytometry comprises contacting the sample with one or more buffer reagents selected from the group consisting of IL-3, heparin, and calcium.

Embodiment 43: An embodiment of any of the embodiments of embodiment 29-42, wherein the sample comprises whole blood or isolated peripheral blood mononuclear cells.

Embodiment 44: An embodiment of any of the embodiments of embodiment 29-43, wherein each of the two or more chemical stimuli independently comprises an allergen.

Embodiment 45: A machine-readable non-transitory medium embodying information indicative of instructions for causing one or more computer systems to perform operations for automated testing of a sample response to a chemical stimulus, the operations comprising: measuring, using flow cytometry of a first portion of the sample, one or more fluorescence intensities associated with activation of the first portion as induced by a first concentration of the chemical stimulus; determining whether an activation response is greater than a preselected threshold, wherein the activation response is a function of the one or more measured fluorescence intensities; and based on a determination that the activation response is greater than the preselected threshold, automatically quantifying, using flow cytometry of a second portion of the sample, one or more fluorescence intensities associated with activation of the second portion as induced by a second concentration of the chemical stimulus, wherein the second concentration is lower than the first concentration.

Embodiment 46: A machine-readable non-transitory medium embodying information indicative of instructions for causing one or more computer systems to perform operations for automated testing of a sample response to a chemical stimulus, the operations comprising: measuring, using flow cytometry of a first portion of the sample, one or more fluorescence intensities associated with activation of the first portion as induced by a first concentration of the chemical stimulus; determining whether an activation response is less than a preselected threshold, wherein the activation response is a function of the one or more measured fluorescence intensities; and based on a determination that the activation response is less than the preselected threshold, automatically quantifying, using flow cytometry of a second portion of the sample, one or more fluorescence intensities associated with activation of the second portion as induced by a second concentration of the chemical stimulus, wherein the second concentration is greater than the first concentration.

Embodiment 47: A machine-readable non-transitory medium embodying information indicative of instructions for causing one or more computer systems to perform operations for automated testing of a sample response to a panel of chemical stimuli, the operations comprising: measuring, using flow cytometry of a first portion of the sample, one or more fluorescence intensities associated with activation of the first portion as induced by a combination of two or more chemical stimuli; determining whether a first activation response is greater than a preselected threshold, wherein the first activation response is a function of the one or more measured fluorescence intensities; and based on a determination that the first activation response is greater than the preselected threshold, automatically quantifying, using flow cytometry of a second portion of the sample, one or more fluorescence intensities associated with activation of the second portion as induced by a first chemical stimulus of the two or more chemical stimuli.

Embodiment 48: An embodiment of embodiment 47, wherein the operations further comprise: determining whether a second activation response is greater than the preselected threshold, wherein the second activation response is a function of the one or more quantified fluorescence intensities; and based on a determination that the second activation response is greater than the preselected threshold, automatically obtaining, using flow cytometry of a third portion of the sample, one or more fluorescence intensities associated with activation of the third portion as induced by a combination of each of the two or more chemical stimuli other than the first chemical stimulus.

Embodiment 49: An embodiment of embodiment 47, wherein the operations further comprise: determining whether a second activation response is greater than the preselected threshold, wherein the second activation response is a function of the one or more quantified fluorescence intensities; and based on a determination that the second activation response is greater than the preselected threshold, automatically obtaining, using flow cytometry of a third portion of the sample, one or more fluorescence intensities associated with activation of the third portion as induced by a second chemical stimulus of the two or more chemical stimuli other than the first chemical stimulus.

Embodiment 50: A computer system for testing of a sample response to a chemical stimulus, the system comprising: one or more components of a flow cytometry machine; at least one processor; and a memory operatively coupled with the at least one processor, the at least one processor executing from the memory instructions comprising: program code for measuring, using flow cytometry of a first portion of the sample, one or more fluorescence intensities associated with activation of the first portion as induced by a first concentration of the chemical stimulus; program code for determining whether an activation response is greater than a preselected threshold, wherein the activation response is a function of the one or more measured fluorescence intensities; and program code for an operation configured to be automatically performed based on a determination that the activation response is greater than the preselected threshold, wherein the operation comprises: quantifying, using flow cytometry of a second portion of the sample, one or more fluorescence intensities associated with activation of the second portion as induced by a second concentration of the chemical stimulus, wherein the second concentration is lower than the first concentration.

Embodiment 51: A computer system for testing of a sample response to a chemical stimulus, the system comprising: one or more components of a flow cytometry machine; at least one processor; and a memory operatively coupled with the at least one processor, the at least one processor executing from the memory instructions comprising: program code for measuring, using flow cytometry of a first portion of the sample, one or more fluorescence intensities associated with activation of the first portion as induced by a first concentration of the chemical stimulus; program code for determining whether an activation response is less than a preselected threshold, wherein the activation response is a function of the one or more measured fluorescence intensities; and program code for an operation configured to be automatically performed based on a determination that the activation response is less than the preselected threshold, wherein the operation comprises: quantifying, using flow cytometry of a second portion of the sample, one or more fluorescence intensities associated with activation of the second portion as induced by a second concentration of the chemical stimulus, wherein the second concentration is greater than the first concentration.

Embodiment 52: A computer system for testing of a sample response to a panel of chemical stimuli, the system comprising: one or more components of a flow cytometry machine; at least one processor; and a memory operatively coupled with the at least one processor, the at least one processor executing from the memory instructions comprising: program code for measuring, using flow cytometry of a first portion of the sample, one or more fluorescence intensities associated with activation of the first portion as induced by a combination of two or more chemical stimuli; program code for determining whether a first activation response is greater than a preselected threshold, wherein the first activation response is a function of the one or more measured fluorescence intensities; and program code for a first operation configured to be automatically performed based on a determination that the first activation response is greater than the preselected threshold, wherein the operation comprises: quantifying, using flow cytometry of a second portion of the sample, one or more fluorescence intensities associated with activation of the second portion as induced by a first chemical stimulus of the two or more chemical stimuli.

Embodiment 53: An embodiment of embodiment 52, wherein the instructions further comprise: program code for determining whether a second activation response is greater than the preselected threshold, wherein the second activation response is a function of the one or more quantified fluorescence intensities; and program code for a second operation configured to be automatically performed based on a determination that the second activation response is greater than the preselected threshold, wherein the operation comprises: obtaining, using flow cytometry of a third portion of the sample, one or more fluorescence intensities associated with activation of the third portion as induced by a combination of each of the two or more chemical stimuli other than the first chemical stimulus.

Embodiment 54: An embodiment of embodiment 52, wherein the instructions further comprise: program code for determining whether a second activation response is greater than the preselected threshold, wherein the second activation response is a function of the one or more quantified fluorescence intensities; and program code for a second operation configured to be automatically performed based on a determination that the second activation response is greater than the preselected threshold, wherein the operation comprises: obtaining, using flow cytometry of a third portion of the sample, one or more fluorescence intensities associated with activation of the third portion as induced by a second chemical stimulus of the two or more chemical stimuli other than the first chemical stimulus.

While the disclosure has been described in detail, modifications within the spirit and scope of the disclosure will be readily apparent to those of skill in the art in view of the foregoing discussion, relevant knowledge in the art, and references discussed above in connection with the Background and Detailed Description, the disclosures of which are all incorporated herein by reference. In addition, it should be understood that aspects of the disclosure and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the invention.

What is claimed is:

1. A method for automated testing of a response of a sample to a chemical stimulus, the method comprising:
   measuring, using flow cytometry of a first portion of the sample, one or more fluorescence intensities associated with activation of the first portion as induced by a first concentration of the chemical stimulus;
   determining, using a computer system, whether an activation response is greater than a preselected threshold, wherein the activation response is a function of the one or more measured fluorescence intensities; and
   providing an operation configured to be automatically performed by the computer system only if the determination concludes that the activation response is greater than the preselected threshold, wherein the operation comprises:
   quantifying, using flow cytometry of a second portion of the sample, one or more fluorescence intensities associated with activation of the second portion as induced by a second concentration of the chemical stimulus, wherein the second concentration is lower than the first concentration.

2. The method of claim 1, further comprising:
   prior to the measuring step, receiving user input selecting the first concentration of the chemical stimulus.

3. The method of claim 1, further comprising:
   prior to the determining step, receiving user input assigning a value to the preselected threshold.

4. The method of claim 1, wherein the activation of the first portion of the sample comprises activation of basophils within the first portion, and wherein the activation of the second portion of the sample comprises activation of basophils within the second portion.

5. The method of claim 1, further comprising:
   prior to the flow cytometry of the first and second portions of the sample, treating the sample with a lysing reagent.

6. The method of claim 1, wherein the flow cytometry of the first and second portions of the sample comprises contacting the sample with antibodies to one or more activation markers.

7. The method of claim 6, wherein the one or more activation markers are each independently selected from the group consisting of CD63, CD107a, CD107b, CD13, CD164, CD69, p38 MAPK, and STAT5.

8. The method of claim 1, wherein the flow cytometry of the first and second portions of the sample comprises contacting the sample with antibodies to one or more identification markers.

9. The method of claim 8, wherein the one or more identification markers are each independently selected from the group consisting of CCR3, CD203c, CD123, IgE, and CRTH2.

10. The method of claim 1, wherein the flow cytometry of the first and second portions of the sample comprises contacting the sample with one or more control markers.

11. The method of claim 10, wherein the control markers are selected from the group consisting of anti-FcεRI and fMLP.

12. The method of claim 1, wherein the flow cytometry of the first and second portions of the sample comprises contacting the sample with one or more buffer reagents selected from the group consisting of IL-3, heparin, and calcium.

13. The method of claim 1, wherein the sample comprises whole blood or isolated peripheral blood mononuclear cells.

14. The method of claim 1, wherein the chemical stimulus comprises an allergen.

15. A method for automated testing of a response of a sample to a chemical stimulus, the method comprising:
    measuring, using flow cytometry of a first portion of the sample, one or more fluorescence intensities associated with activation of the first portion as induced by a first concentration of the chemical stimulus;
    determining, using a computer system, whether an activation response is less than a preselected threshold, wherein the activation response is a function of the one or more measured fluorescence intensities; and
    providing an operation configured to be automatically performed by the computer system only if the determination concludes that the activation response is less than the preselected threshold, wherein the operation comprises:
    quantifying, using flow cytometry of a second portion of the sample, one or more fluorescence intensities associated with activation of the second portion as induced by a second concentration of the chemical stimulus, wherein the second concentration is greater than the first concentration.

16. The method of claim 15, wherein the activation of the first portion of the sample comprises activation of basophils within the first portion, and wherein the activation of the second portion of the sample comprises activation of basophils within the second portion.

17. A method for automated testing of a response of a sample to a panel of chemical stimuli, the method comprising:
    measuring, using flow cytometry of a first portion of the sample, one or more fluorescence intensities associated with activation of the first portion as induced by a combination of two or more chemical stimuli;
    determining, using a computer system, whether a first activation response is greater than a preselected threshold, wherein the first activation response is a function of the one or more measured fluorescence intensities; and
    providing a first operation configured to be automatically performed by the computer system only if the determination concludes that the first activation response is greater than the preselected threshold, wherein the first operation comprises:

quantifying, using flow cytometry of a second portion of the sample, one or more fluorescence intensities associated with activation of the second portion as induced by a first chemical stimulus of the two or more chemical stimuli.

18. The method of claim 17, further comprising:

determining, using the computer system, whether a second activation response is greater than the preselected threshold, wherein the second activation response is a function of the one or more quantified fluorescence intensities; and providing a second operation configured to be automatically performed by the computer system only if the based on a determination concludes that the second activation response is greater than the preselected threshold, wherein the second operation comprises:

obtaining, using flow cytometry of a third portion of the sample, one or more fluorescence intensities associated with activation of the third portion as induced by a combination of each of the two or more chemical stimuli other than the first chemical stimulus.

19. The method of claim 17, further comprising:

determining, using the computer system, whether a second activation response is greater than the preselected threshold, wherein the second activation response is a function of the one or more quantified fluorescence intensities; and providing a second operation configured to be automatically performed by the computer system only if the determination concludes that the second activation response is greater than the preselected threshold, wherein the second operation comprises:

obtaining, using flow cytometry of a third portion of the sample, one or more fluorescence intensities associated with activation of the third portion as induced by a second chemical stimulus of the two or more chemical stimuli other than the first chemical stimulus.

20. The method of claim 17, wherein the activation of the first portion of the sample comprises activation of basophils within the first portion, and wherein the activation of the second portion of the sample comprises activation of basophils within the second portion.

* * * * *